United States Patent [19]
Saito et al.

[11] Patent Number: 5,874,970
[45] Date of Patent: Feb. 23, 1999

[54] SERIAL PRINTER AND PRINTING METHOD

[75] Inventors: Kazuo Saito; Kenjiro Murakami, both of Nagano, Japan

[73] Assignee: Seiko Epson Corporation, Tokyo, Japan

[21] Appl. No.: 671,643

[22] Filed: Jun. 28, 1996

[30] Foreign Application Priority Data

Jun. 30, 1995 [JP] Japan .................................... 7-166562
May 24, 1996 [JP] Japan .................................... 8-130433

[51] Int. Cl.⁶ ............................ B41J 29/38; B41J 2/145; B41J 2/15
[52] U.S. Cl. .................................. 347/12; 347/16; 347/41
[58] Field of Search ................. 347/41, 9, 16, 347/12, 40

[56] References Cited

U.S. PATENT DOCUMENTS 4,198,642  4/1980  Gamblin .................................... 346/75

*Primary Examiner*—David M. Gray
*Assistant Examiner*—Christopher E. Mahoney
*Attorney, Agent, or Firm*—Sughrue, Mion, Zinn, Macpeak & Seas, PLLC

[57] ABSTRACT

The present invention provides a serial printer and a printing method using the serial printer. In the serial printer, assuming that the number of driven nozzles arranged in a secondary scanning direction on a print head is n and a nozzle pitch is a k-dot pitch, k is set to an integer which is no greater than n and has no prime factors greater than one in common with n. Further, secondary scanning is performed at least once at each of the start of printing and the termination of printing using a paper feeding distance of an m-dot pitch. On the other hand, secondary scanning other than the at least once secondary scanning is performed using an interlaced printing paper feeding distance of an n-dot pitch. In this case, m is an integer which is less than n and has no prime factors greater than one in common with k. Preferably, m=k±j, wherein j is an integer no less than 1 and less than n.

15 Claims, 11 Drawing Sheets

SERIAL PRINTER AND PRINTING METHOD

BACKGROUND OF THE INVENTION

1. Field of the Invention

The present invention relates to a serial printer with a print head which performs the raster scanning on a print medium, such as a sheet of paper and a printing method utilizing the raster scanning.

2. Description of the Prior Art

A print head of a serial printer has a dot forming element array with a number of dot forming elements arranged in a secondary scanning direction, that is, in the direction of movement of a print medium, such as a paper sheet. With this element array, a number of lines can be simultaneously printed on the paper sheet by means of one main scanning pass of the print head across the paper sheet. In the serial printer using such a print head, particularly an ink jet printer, unevenness in characteristic of individual ink jet nozzles or unevenness in pitch between the adjacent ink jet nozzles raises a problem in view of achieving the high-quality print image.

For solving this problem, U.S. Pat. No. 4,198,642 has proposed a printing method called "interlaced printing" which can provide high-quality printing by making unobtrusive the unevenness in characteristic or pitch of the ink jet nozzles on a printed image. This interlaced printing employs a nozzle array with N ink jet nozzles arranged in the secondary scanning direction at a pitch corresponding to a k-dot pitch in the print resolution, wherein k is an integer no greater than n which represents the number of the ink jet nozzles to be driven among the N ink jet nozzles, and has no prime factors greater than one in common with n. Every time the nozzle array has achieved one main scanning pass across the paper sheet, the secondary scanning, that is, paper feeding, is performed by a distance corresponding to an n-dot pitch.

An example is given hereinbelow.

In this example, a nozzle array with 20 nozzles (N=n=20) arranged at a pitch corresponding to a 3-dot pitch (k=3) is used for printing an image with a resolution of 360 dpi. Expressed in terms of inch, a one-dot pitch is equal to $1/360$ inches so that the nozzle pitch, which is the 3-dot pitch, is equal to $3/360$ inches, and a paper feeding distance achieved by one-time secondary scanning, that is, a secondary scanning distance, is equal to $20/360$ inches.

Accordingly, if the secondary scanning (paper feeding) is performed once, each nozzle is moved by $20/360$ inches so that each nozzle is moved to a position one-dot pitch before a position where a seven-ahead nozzle was located upon the last main scanning, that is, one-dot pitch before $21/360$ inches ahead. If the secondary scanning is performed once again, each nozzle is moved to a position two-dot pitch before a position where a fourteen-ahead nozzle was located upon the before-last main scanning. In other words, when a line is printed by means of each of the nozzles during a certain main scanning pass, an upper line adjacent to each printed line is printed, during a subsequent main scanning pass, by means of a nozzle which is seven-nozzles apart from the corresponding nozzle. Similarly, a further upper line adjacent to each of the foregoing upper lines is printed, during a further subsequent main scanning pass, by means of a nozzle which is fourteen-nozzles apart from the foregoing corresponding nozzle.

In this fashion, in the interlaced printing, the adjacent lines are always printed by the different nozzles. Thus, even if unevenness exists in nozzle characteristic or nozzle pitch, as described before, to some degree, the unevenness is rendered unobtrusive on the printed image so that the high-quality print image can be achieved.

On the other hand, the foregoing conventional interlaced printing still includes the following problem:

Specifically, in the conventional interlaced printing, incomplete print regions where lines can not be printed fully densely are caused at leading and trailing ends, in the secondary scanning direction, of the paper sheet. In the foregoing example, a region having a width of $38/360$ inches extending downward from a position of the uppermost nozzle of the nozzle array during the first main scanning pass becomes an incomplete print region. Similarly, an incomplete print region having an approximately equal width exists at the trailing end of the paper sheet. These incomplete print regions at the leading and trailing ends of the paper sheet can not be used as printing regions. Thus, in the actual interlaced printing, for causing the leading and trailing incomplete print regions to be outside a printing region of the paper sheet where the printing is to be performed, the print head is set to be positioned so as to offset from upper and lower ends of the printing region of the paper sheet by distances corresponding to widths of the incomplete print regions. However, if the offset magnitudes of the print head relative to the paper sheet are so large, gaps between the print head and the paper sheet become unstable so that the quality of the print image is largely lowered.

Particularly, in recent years, such printers are widely available on the market, wherein a paper regulating section for regulating a position of a paper sheet upon printing is offset from a position confronting a print head toward a paper outlet side. In the printer thus structured, a distance from the leading end of the paper sheet to the upper end of the printing region and a distance from the lower end of the printing region to the trailing end of the paper sheet become greater as compared with the case where the paper regulating section is arranged at the position confronting the print head. Thus, the regions are enlarged where the foregoing gaps are unstable. On the other hand, although it has been attempted to increase the number of the nozzles arranged in the nozzle array for enhancing the printing efficiency, this increases the foregoing offset magnitudes of the print head relative to the paper sheet and narrows the high-quality printing region.

As one method for diminishing the offset magnitudes of the print head, it may be considered to employ the normal printing method, instead of the interlaced printing method, in the foregoing incomplete print regions so as to print the lines densely. As appreciated, in the normal printing method, the secondary scanning is performed by the one-dot pitch every time the main scanning is finished, However, according to this method, the print image quality of the region where the normal printing method is applied is largely deteriorated as compared with the print image quality of the region where the interlaced printing method is applied, and thus the boundary therebetween becomes remarkable. This is because, since the adjacent lines corresponding in number to the foregoing integer k are printed by the same nozzles in the normal printing method, the unevenness in nozzle characteristic or nozzle pitch appears clearly on the printed image.

SUMMARY OF THE INVENTION

Therefore, it is an object of the present invention to provide an improved serial printer. And it is another object of the present invention to provide an improved printing method utilizing the interlaced printing.

According to one aspect of the present invention, a serial printer comprises a print head having N dot forming elements arranged in a secondary scanning direction, N being an integer; main scanning control means for operating the dot forming elements to print on a print medium while performing main scanning across the print medium using the print head; and secondary scanning control means for performing secondary scanning on the print medium after the main scanning, wherein, given that a pitch of the dot forming elements is k times a dot pitch in print resolution and that k is an integer which is no greater than n and has no prime factors greater than one in common with n, n being an integer no greater than N and representing the number of the dot forming elements to be driven, the secondary scanning control means performs the secondary scanning at least once at each of the start of the printing and the termination of the printing using a first secondary scanning distance which is m times the dot pitch and performs the secondary scanning other than the at least once secondary scanning using a second secondary scanning distance which is n times the dot pitch, m being an integer which is less than n and has no prime factors greater than one in common with k.

According to another aspect of the present invention, a printing method comprises the steps of: (A) arranging N dot forming elements in a secondary scanning direction, N being an integer, a pitch of the dot forming elements being k times a dot pitch in-print resolution; (B) performing a main scanning for moving the dot forming elements in a main scanning direction; (C) driving the dot forming elements for forming a number of dots at the step (B); (D) performing a first secondary scanning for moving the dot forming elements in a secondary scanning direction at least once at each of the start of the printing and the termination of the printing, and using a first secondary scanning distance which is m times the dot pitch, m being an integer which is less than n and has no prime factors greater than one in common with k, wherein n is an integer no greater than N and represents the number of the dot forming elements to be driven, and k is an integer which is no greater than n and has no prime factors greater than one in common with n; and (E) performing a second secondary scanning for moving the dot forming elements in a secondary scanning direction and using a second secondary scanning distance which is n times the dot pitch; (F) repeating the steps (B), (C) and (E).

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENTS

Figure 10:
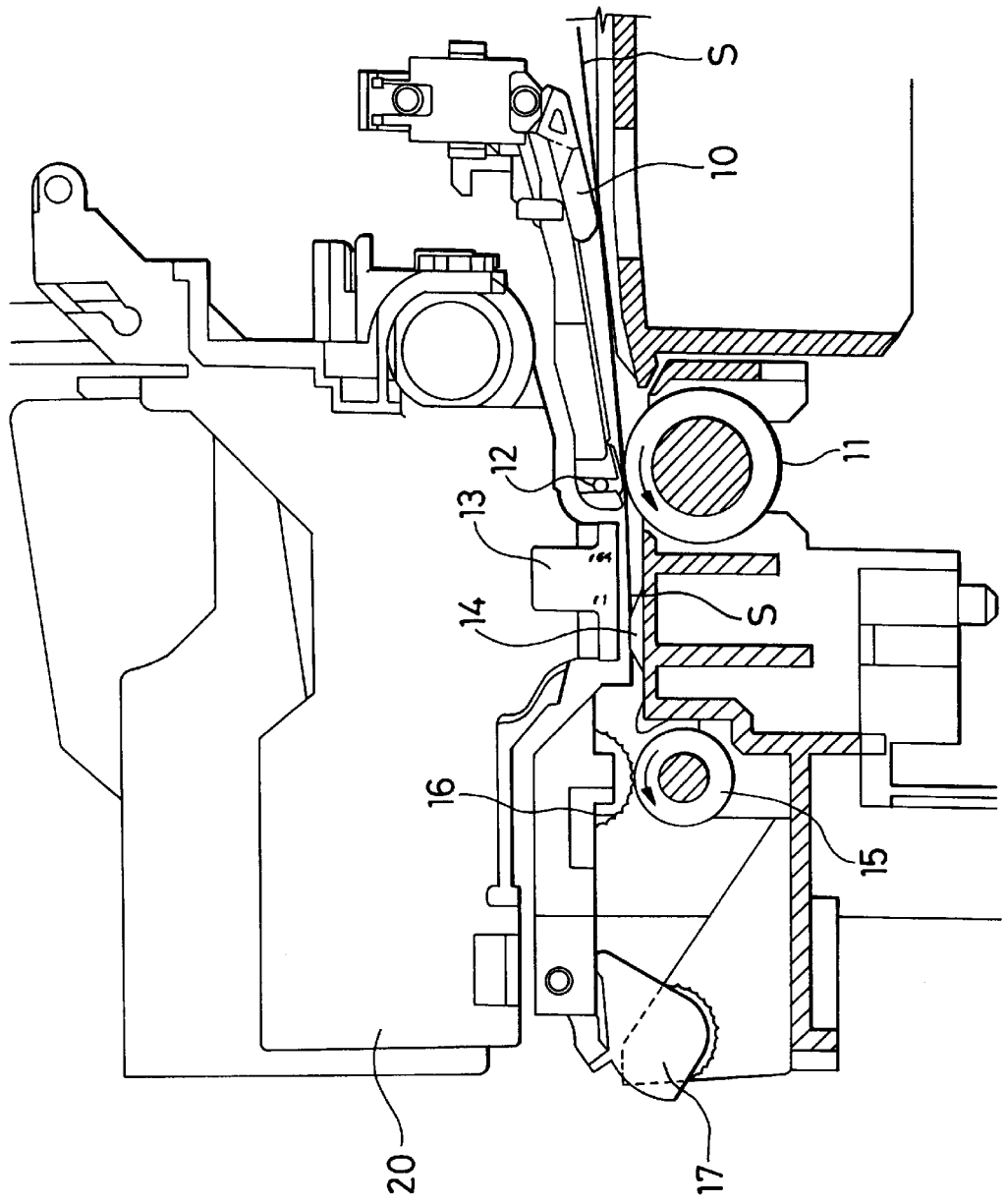
FIG. 10 is a partial sectional view showing a state of the printing mechanism during printing.
Figure 11:
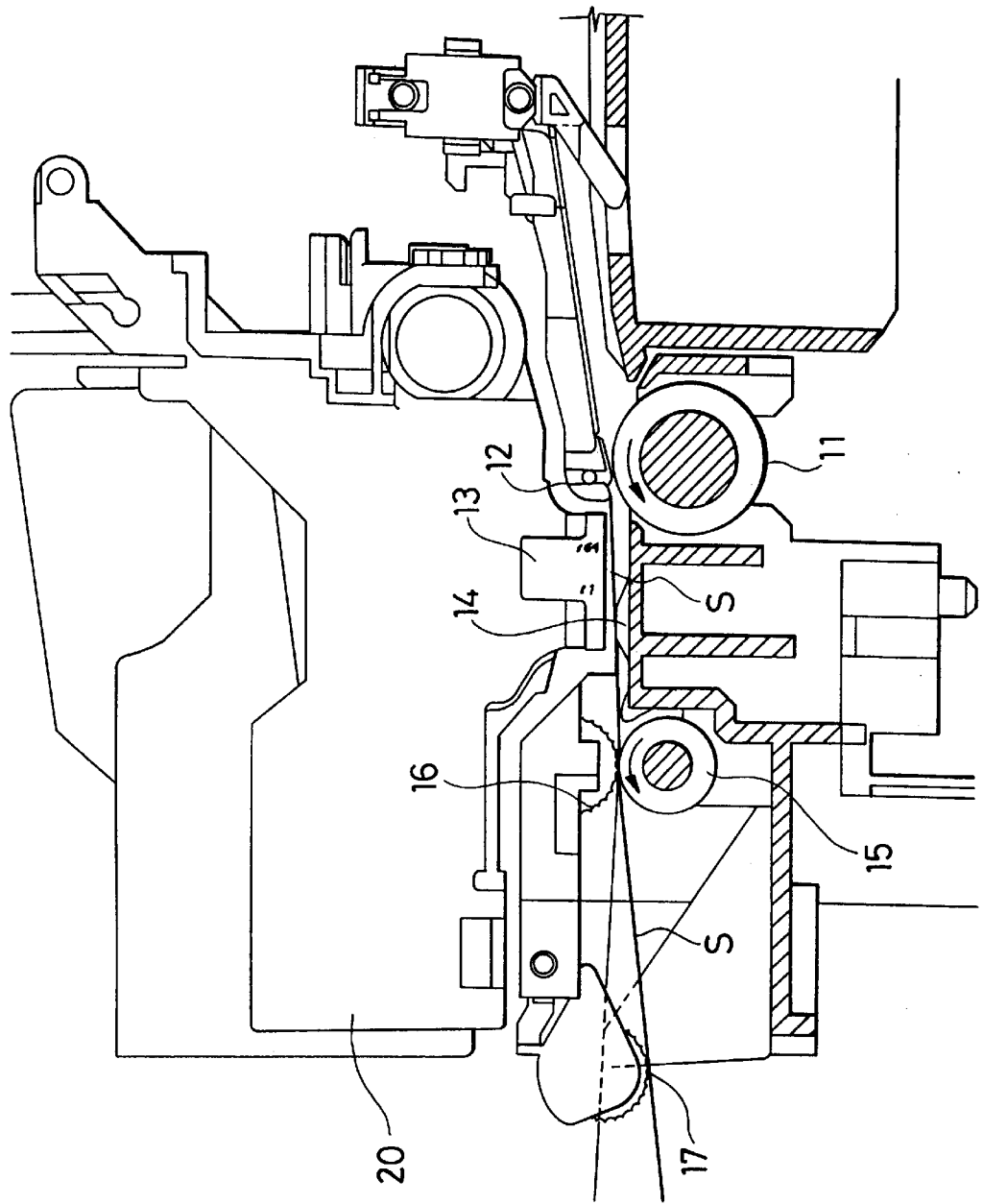
FIG. 11 is a partial sectional view showing a state of the printing mechanism upon termination of the printing.

Prior to describing the preferred embodiments, a relationship between the printing mechanism and the transfer state of a paper sheet in a printer where the present invention is applied, will be described hereinbelow with reference to FIGS. 9 to 11.

Figure 9:
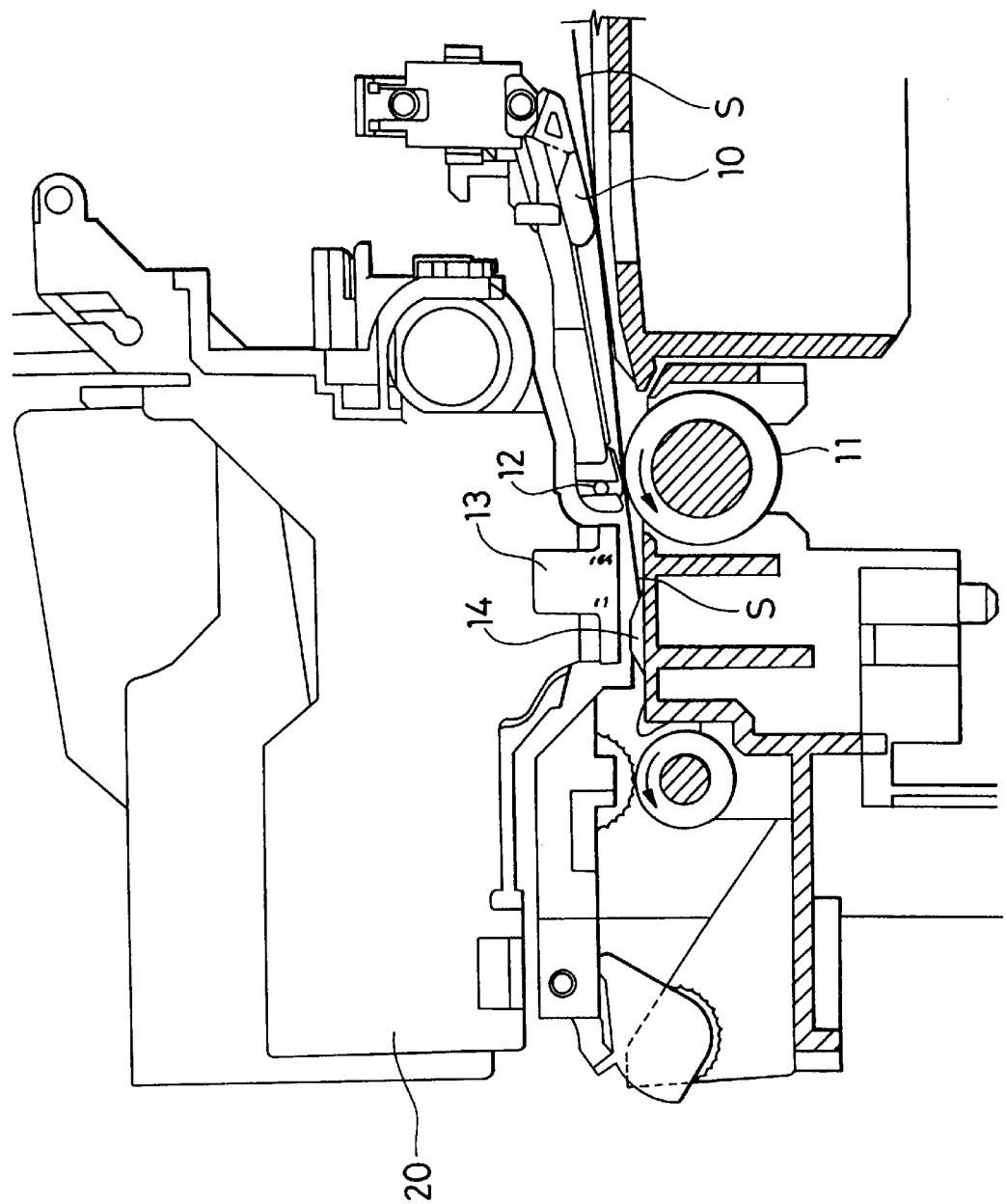
FIG. 9 is a partial sectional view showing a printing mechanism of a printer where the present invention is applied.

In FIG. 9, a paper sheet S is transferred from a paper inlet at the right in the figure toward the left in the figure. When the paper sheet S passes a paper sensor 10, a drive control section (not shown) detects the change of the paper sensor 10 from off to on and drives a paper feed roller 11 and a follower roller 12. Thus, the paper sheet S is transferred toward a print head 13. The print head 13 has a nozzle array arranged with, for example, 64 dot forming elements, such as 64 ink jet nozzles (#1~#64). At a position confronting the print head 13 is arranged a paper regulating section 14 for regulating a position of the paper sheet S upon printing. The paper regulating section 14 has a planar surface parallel to a head surface of the print head 13 and an inclined surface at the side of the paper inlet. The planar surface of the section 14 is oriented toward the head surface of the print head 13 other than a portion of the head surface where the nozzle array is mounted. Numeral 20 in the figure denotes a carriage for moving the print head 13 during the main scanning.

With this arrangement, the leading end, in the secondary scanning direction, of the paper sheet S transferred between the paper feed roller 11 and the follower roller 12 reaches the inclined surface of the paper regulating section 14 at a given angle. Thereafter, the leading end of the paper sheet S reaches the parallel surface of the paper regulating section 14, guided by the inclined surface thereof. FIG. 10 shows this state. In the state shown in FIG. 10, the paper sheet S is parallel to the print head 13, and thus gaps between a print surface of the paper sheet S and the print head 13 become stable to make possible the high-quality printing. The paper sheet S on the parallel surface of the paper regulating section 14 is, while applied with the interlaced printing, held between a paper discharge roller 15 and a notched roller 16 in sequence from the leading end to the trailing end thereof, and further guided toward a paper outlet via an auxiliary paper discharge notched member 17. Then, when the printing on the paper sheet S is further advanced, the trailing end of the paper sheet S is released from between the paper feed roller 11 and the follower roller 12. FIG. 11 shows this state.

Now, a first preferred embodiment of the present invention will be described hereinbelow.

Figure 1:
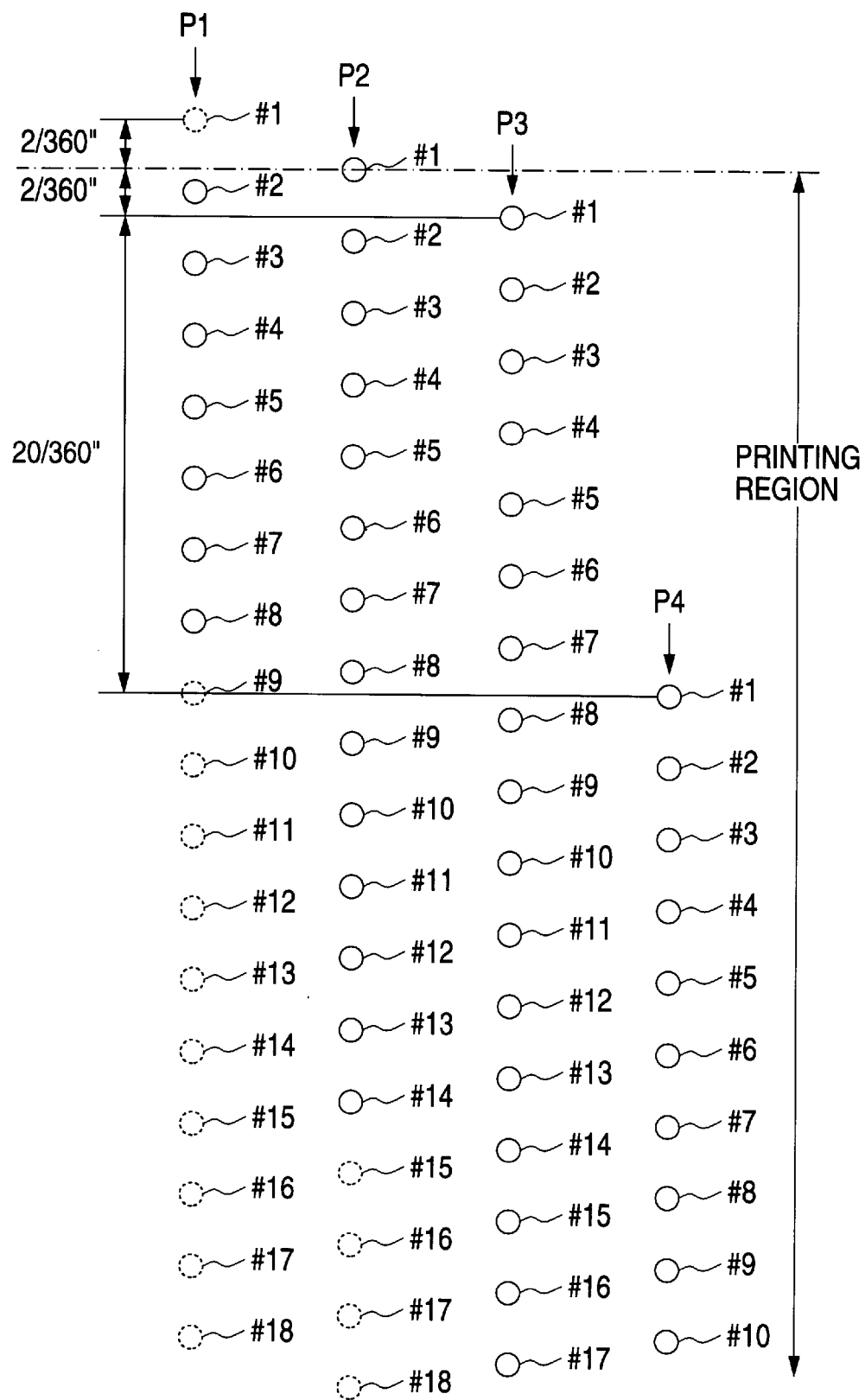
FIG. 1 is an explanatory diagram showing nozzle positions just after the start of printing according to a first preferred embodiment of the present invention.
Figure 2:
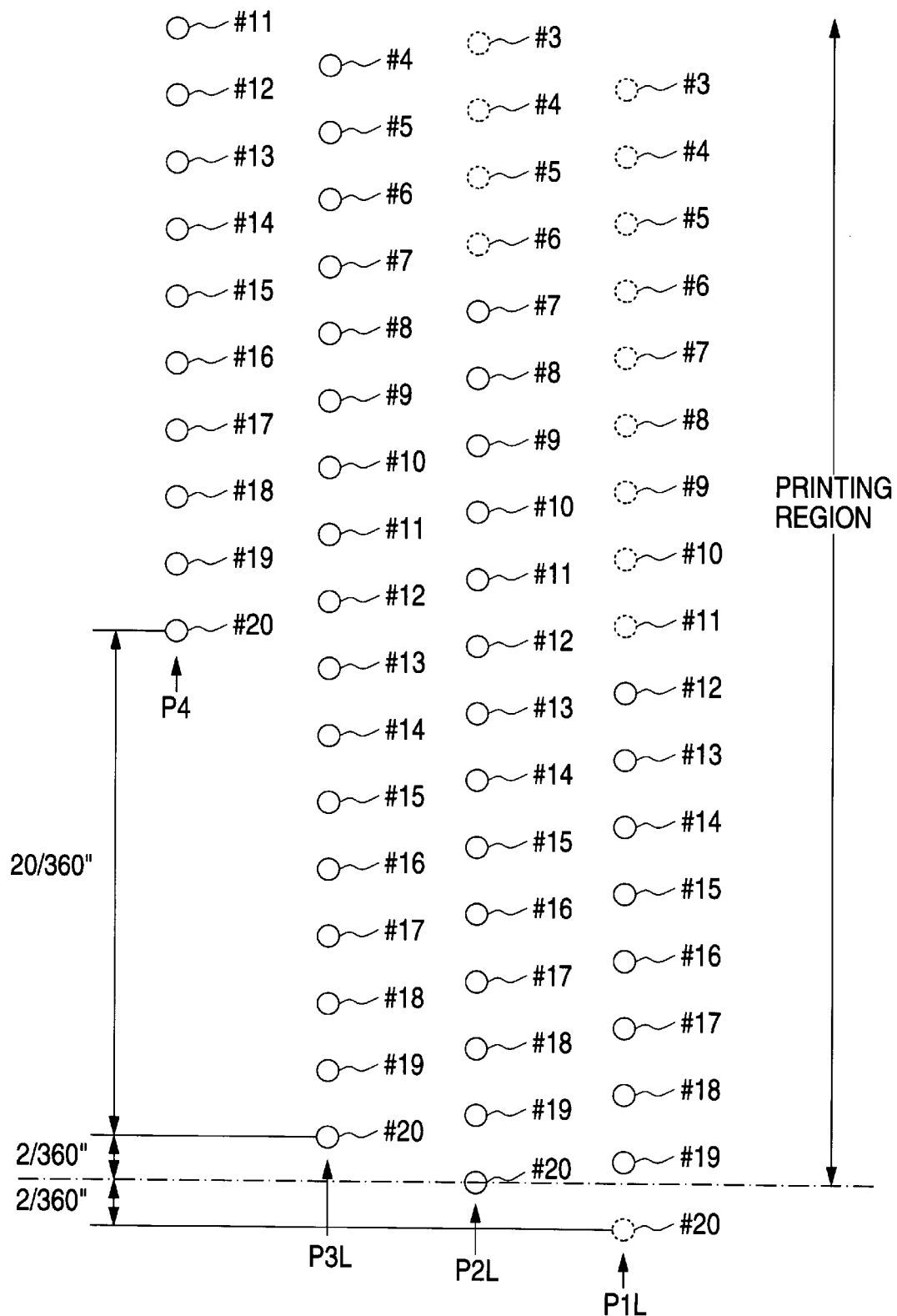
FIG. 2 is an explanatory diagram showing nozzle positions just before the termination of printing according to the first preferred embodiment.

FIG. 1 shows positions of the nozzle array just after the start of the printing, while FIG. 2 shows positions of the nozzle array just before the termination of the printing. In the figures, the paper sheet is transferred upward from below, that is, the print head performs the secondary scanning downward on the paper sheet. The main scanning is performed from the left to the right across the paper sheet. Symbols P1, P2 and P3 denote positions of the nozzle array upon the first, second and third main scanning passes, respectively. Solid circles represent the nozzles used in printing, while broken circles represent the nozzles not used in printing.

The first preferred embodiment aims to fully print the foregoing incomplete print regions in the interlaced printing under the same condition as that of the foregoing conventional example. Accordingly, the print resolution is set to 360 dpi, the number of nozzles n (=N) to 20, and the nozzle pitch to the 3-dot pitch (k=3) (=3/360 inches). Further, an integer j is set to "1".

In this embodiment, two kinds of values are set for paper feeding distances, that is, distances of the secondary scanning.

The first secondary scanning distance is set to an m-dot pitch (m=k−j=k−1=2) (=2/360 inches), as shown in FIG. 1 between P1 and P2 and between P2 and P3 and as shown in FIG. 2 between P3L (the main scanning pass before the before-last main scanning pass) and P2L (the before-last main scanning pass) and between P2L and P1L (the last main scanning pass).

The second secondary scanning distance is set to an n-dot pitch (n=20) (=20/360 inches) between P3 and P3L, and thus equal to the secondary scanning distance according to the foregoing conventional interlaced printing method.

As shown in FIG. 1, when the first 2-dot pitch secondary scanning is performed after the first main scanning pass P1, each nozzle is moved to a position one-dot pitch before a position- where a one-ahead nozzle was located upon the first main scanning pass P1. At this position, the second main scanning pass P2 is performed. Subsequently, when the second 2-dot pitch secondary scanning is performed, each nozzle is moved to a position one-dot pitch before a position where a one-ahead nozzle was located upon the second main scanning pass P2. At this position, the third main scanning pass P3 is performed. Thereafter, the interlaced printing with the 20-dot pitch secondary scanning is performed.

According to the foregoing operation, fully dense lines can be printed by means of the first, second and third main scanning passes P1, P2 and P3, except at a position of the uppermost nozzle #1 upon the first main scanning pass. In the incomplete print region which would be otherwise caused at the start of the interlaced printing, that is, a region having a width of 38/360 inches extending downward from a position of the uppermost nozzle #1 upon the third main scanning pass P3, the dense lines are already printed by the main scanning passes P1, P2 and P3.

Figure 8:
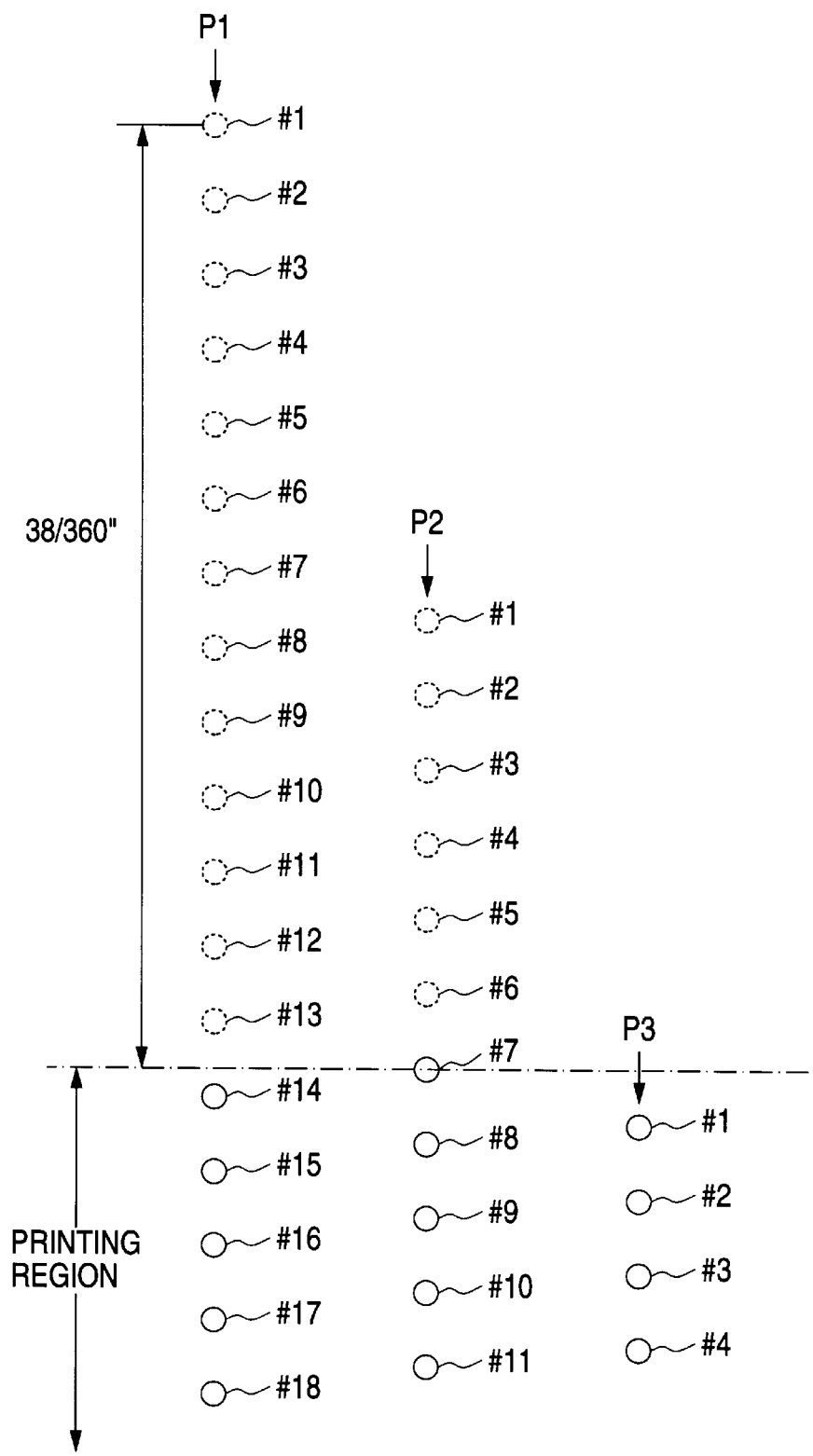
FIG. 8 is an explanatory diagram showing nozzle positions just after the start of printing according to the related art.

As a result, only the region having a width of 2/360 inches extending downward from the position of the uppermost nozzle #1 upon the first main scanning pass P1 becomes a region where the fully dense printing is not possible. Accordingly, at the start of the printing, the print head can be set to offset from the upper end of the printing region only by 2/360 inches. On the other hand, as shown in FIG. 8 and as described before, in the conventional interlaced printing, the incomplete print regions extend over the widths of 38/360 inches from the leading and trailing ends of the paper sheet. Thus, the advantageous effect is significant in this embodiment.

Further, as seen from FIG. 1, in the lines printed during the first, second and third main scanning passes P1, P2 and P3, the adjacent lines are always printed by the different nozzles. For example, observing the nozzle numbers in order from the uppermost line in the printing region, between two lines printed by the same nozzle is interposed a line printed by the different nozzle like #1, #2, #1, #2, #3, #2, #3, . . . so that the adjacent lines are not printed by the same nozzles.

Further, observing the order of the lines printed, relative to the lines printed during the last main scanning pass, the upper adjacent lines are printed during the subsequent main scanning pass, whether before or after the third main scanning pass P3.

As appreciated, in this embodiment, the quality of the printed image achieved by the main scanning passes P1, P2 and P3 becomes approximately equal to the quality of the printed image achieved by the subsequent interlaced printing. The printing was actually performed under the foregoing condition, and the result was that the high-quality print images were achieved both on the region applied with the interlaced printing and the other region such that no distinction therebetween was possible with the naked eye.

The-same effect can also be achieved at the termination of the printing shown in FIG. 2. Specifically, since the incomplete print region at the termination of the printing is only a region having a width of 2/360 inches from a position of the lowermost nozzle #20 upon the final main scanning pass P1L, the print head can be set to offset from the lower end of the printing region only by 2/360 inches. Further, the high-quality print image approximate to that given by the interlaced printing can be achieved through the non-interlaced printing during the main scanning passes P1L and P2L.

As shown in FIGS. 1 and 2, all the 20 nozzles are used during the interlaced printing, while portions of the nozzles are used during the main scanning passes P1 and P2 at the start of the printing and during the main scanning passes P1L and P2L at the termination of the printing. For example, only the nozzles #2~#8 are used during the first main scanning pass P1, and only the nozzles #1~#14 are used during the second main scanning passes P2. Similarly, only the nozzles #12~#19 are used in the last main scanning pass P1L, and only the nozzles #7~#20 are used in the before-last main scanning pass P2L. The reason for this is that only those lines which can not be printed by the interlaced printing are set to be printed by the foregoing main scanning passes in an interpolating fashion while the those lines which can be printed by the interlaced printing are set to be printed by the interlaced printing. It is important to use the interlaced printing as much as possible for achieving the high-quality print image.

Figure 3:
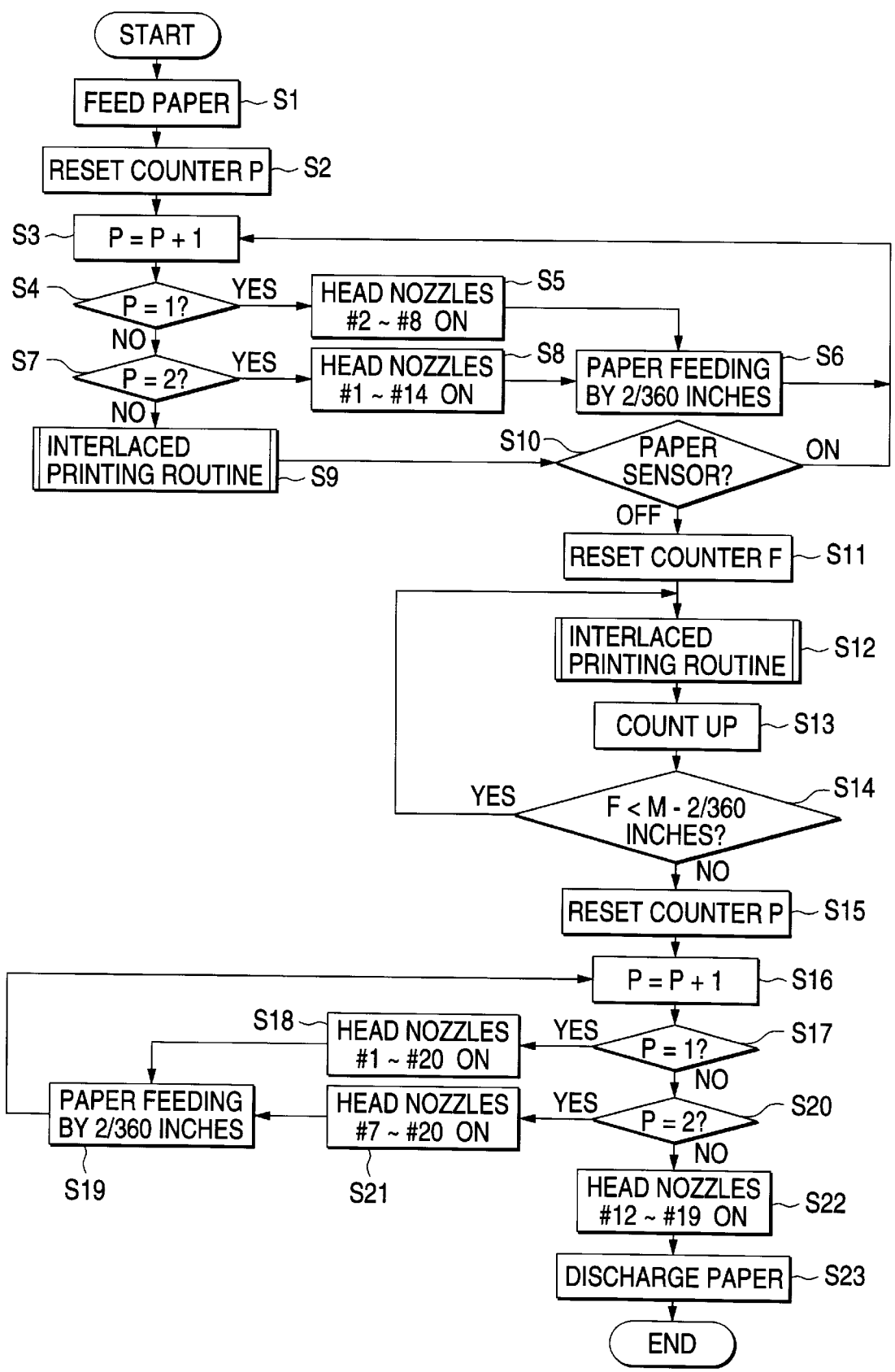
FIG. 3 is a flowchart of a control routine to be executed by a microcomputer according to the first preferred embodiment.

FIG. 3 is a flowchart of a control routine to be executed by a microcomputer for achieving the operations shown in FIGS. 1 and 2. In this flowchart, the secondary scanning is referred to as "paper feeding" for facilitating explanation.

At step S1, a sheet of paper is fed so that the uppermost nozzle of the print head is located at a position 2/360 inches from the upper end of the printing region. Then, a counter for the number P of the main scanning passes is reset to 0 (step S2), and the counter is incremented by "1" (step S3). Subsequently, the number P is checked whether P=1 (step S4). If P=1 representing the first main scanning pass, the routine proceeds to step S5 where the first main scanning pass is performed to achieve the printing using the nozzles #2~#8. Then, at step S6, the paper is fed forward 2/360 inches.

The routine now returns to step S3 where the counter is incremented by "1". Since the answer at step S4 becomes negative at this time, the routine proceeds to step S7 where it is checked whether P=2. If P=2 representing the second main scanning pass, the routine proceeds to step S8 where the second main scanning pass is performed to achieve the printing using the nozzles #1~#14. Then, at step S6, the paper is fed forward by another $2/360$ inches.

The routine again returns to step S3 where the counter is incremented by "1", and now proceeds to step S9 via negative answers at steps S4 and S7. At step S9, an interlaced printing routine is executed. Specifically, the printing is performed during the main scanning pass using all the nozzles #1~#20, and then the paper feeding of $20/360$ inches is performed. These printing and paper feeding iterations are repeated so as to achieve the interlaced printing.

During the execution of the interlaced printing routine, a detection signal from the paper sensor 10 (see FIG. 9) is checked every time the paper is fed. The paper sensor 10 is arranged at a position along the paper feeding route from a paper stacker to the print head. If the detection signal from the paper sensor 10 is on, it represents that the paper sheet does not pass over the paper sensor 10. On the other hand, if the detection signal from the paper sensor 10 is off, it represents that the paper sheet passes over the paper sensor 10. Thus, while the signal from the paper sensor 10 is held on at step S10, the interlaced printing routine continues to be executed.

On the other hand, if the signal from the paper sensor 10 is switched from on to off, the routine proceeds to step S11 where a counter for a secondary scanning distance (the number of drive steps of a stepping motor for driving the paper feed roller 11 shown in FIG. 9) F is reset to 0. Then, the interlaced printing routine continues to be executed at step S12. In the interlaced printing routine at step S12, the secondary scanning distance F representing an actual paper feeding distance is counted up at every paper feeding (step S13). Subsequently, step S14 compares the counted-up secondary scanning distance F with a value (M-$2/360$ inches), wherein M represents a given paper override distance. The paper override distance M represents a paper feeding distance necessary for allowing the paper sheet to move from a point where the trailing end of the paper sheet passes over the paper sensor 10 to a point where the lower end of the printing region of the paper sheet reaches the lowermost nozzle #20 of the print head. This is determined in advance as one of the printer specifications. When the interlaced printing routine at step S12 is repeated, the position of the print head relative to the paper sheet reaches the position of the main scanning pass P3L as shown in FIG. 2, wherein the secondary scanning distance F coincides with the value (M-$2/360$ inches). Thus, the answer at step S14 becomes negative so that the routine proceeds to step S15 where the counter P is reset to 0.

Subsequently, the counter P is incremented by 1 (step S16). Then, step S17 checks whether P=1. Since P=1 at this time representing the main scanning pass P3L which is before the before-last main scanning pass P2L, the routine proceeds to step S18 where the main scanning pass P3L is performed to achieve the printing using all the nozzles #1~#20. Subsequently, the paper fed is forward by $2/360$ inches (step S19).

The routine now returns to step S16 where the counter P is incremented by "1". Since answer at step S17 becomes negative at this time, the routine proceeds to step S20 where it is checked whether P=2. Since P=2 at this time representing the before-last main scanning pass P2L, the routine proceeds to step S21 where the before-last main scanning pass is performed to achieve the printing using the nozzles #7~#20. Then, at step S19, the paper is fed by another $2/360$ inches.

The routine again returns to step S16 where the counter is incremented by "1", and now proceeds to step S22 via negative answers at steps S17 and S20, representing the last main scanning pass P1L. At step S22, the last main scanning pass is performed to achieve the printing using the nozzles #12~#19.

When the printing on one paper sheet is finished, the printed paper sheet is discharged (step S23).

Now, a second preferred embodiment of the present invention will be described hereinbelow.

Figure 4:
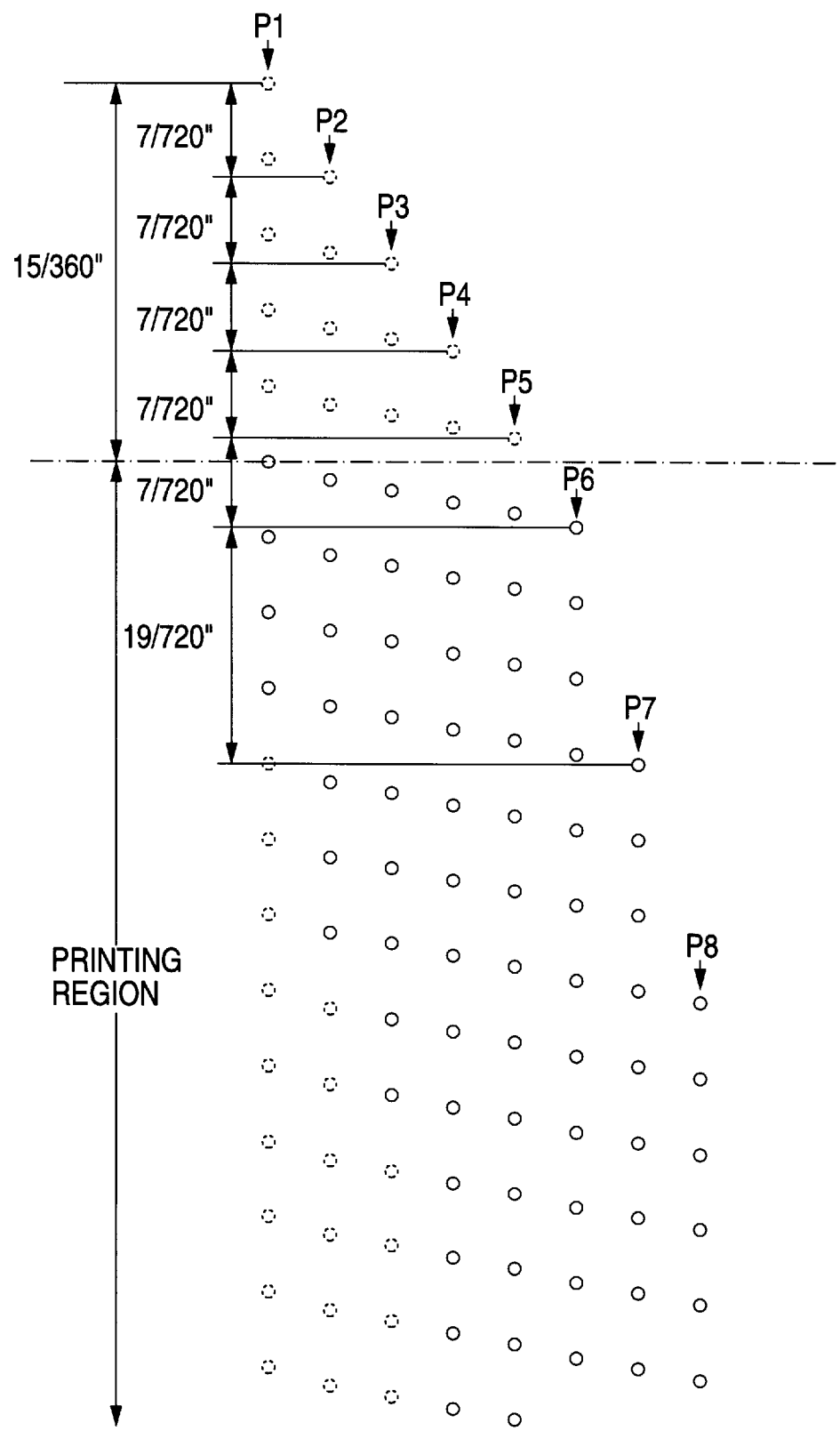
FIG. 4 is an explanatory diagram showing nozzle positions just after the start of printing according to a second preferred embodiment of the present invention.

FIG. 4 shows positions of the nozzle array just after the start of the printing. The positions of the nozzle array just before the termination of the printing are not shown in the drawings. As obvious from the relationship between FIGS. 1 and 2, the figure therefor may be achieved by rotating FIG. 4 by 180 degrees.

The second preferred embodiment is employed for printing an image with a resolution of 720 dpi using the same nozzle array as in the foregoing first preferred embodiment.

In this embodiment, the number n of the nozzles to be driven or used is set to 19. A nozzle pitch is set to a 6-dot pitch (k=6) (=$6/720$=$3/360$ inches). A secondary scanning distance is set to a 7-dot pitch (m=k+j=k+1=7) (=$7/720$ inches) for the five-times secondary scanning performed at each of the start of the printing and the termination of the printing. For the secondary scanning other than the foregoing five-times secondary scanning, a secondary scanning distance is set to a 19-dot pitch (n=19) (=$19/720$ inches), which is for the interlaced printing.

As seen from FIG. 4, a width of the incomplete print region caused at each of the start of the printing and the termination of the printing is $15/360$ inches. On the other hand, although not shown in the drawings, if only the interlaced printing is performed under the same condition, a width of the incomplete print region is known to be $45/360$ inches. Accordingly, the widths of the incomplete print regions are largely reduced and thus offset distances of the print head are largely diminished also in this embodiment.

As appreciated, this embodiment further achieves advantageous effects as those achieved in the foregoing first preferred embodiment.

Now, a third preferred embodiment of the present invention will be described hereinbelow.

Figure 5:
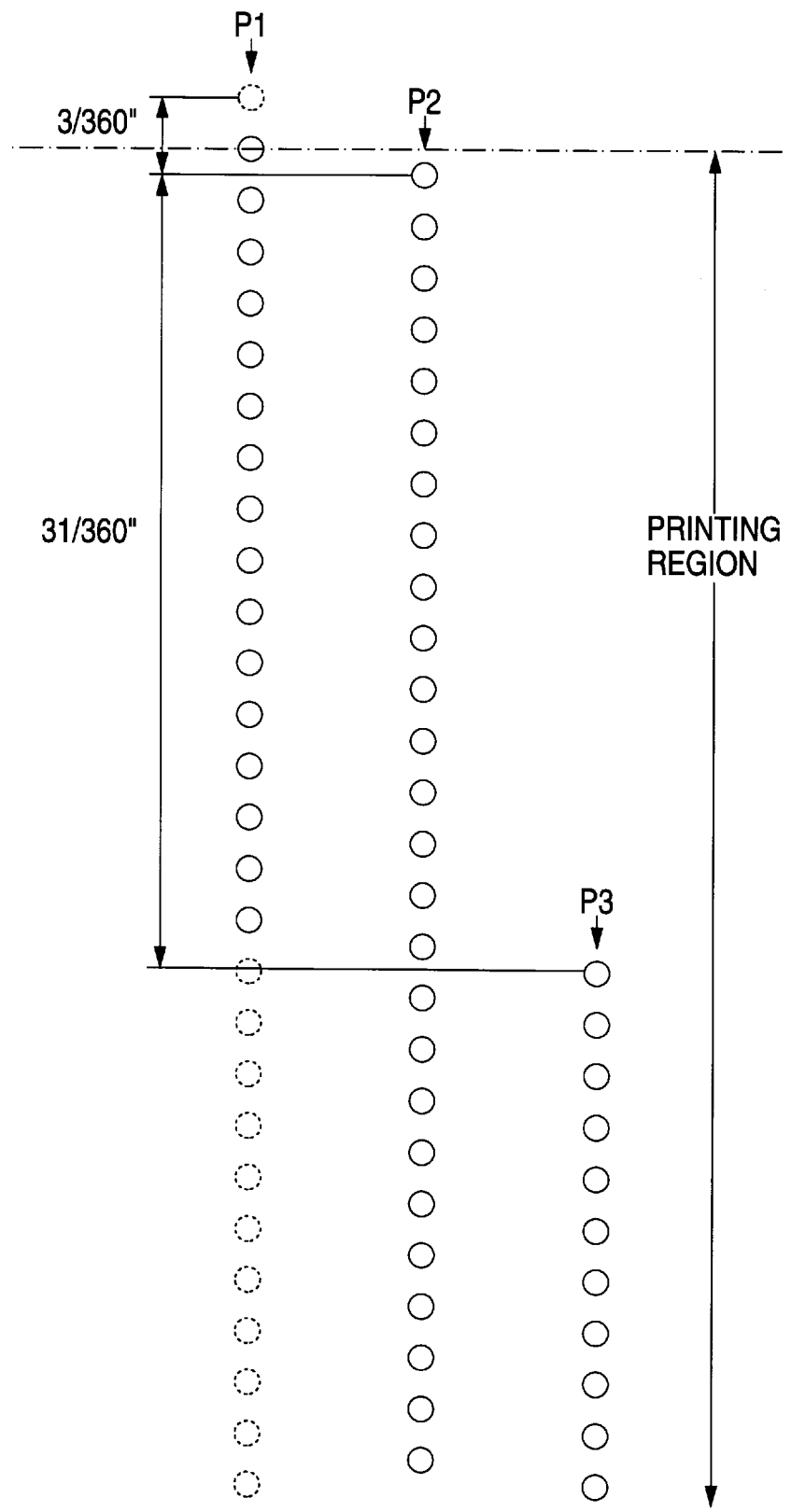
FIG. 5 is an explanatory diagram showing nozzle positions just after the start of printing according to a third preferred embodiment of the present invention.

FIG. 5 shows positions of the nozzle array just after the start of the printing. The positions of the nozzle array just before the termination of the printing are not shown in the drawings. As obvious from the relationship between FIGS. 1 and 2, the figure therefor may be achieved by rotating FIG. 5 by 180 degrees.

The third preferred embodiment is employed for printing an image with a resolution of 360 dpi using the nozzle array with the number n of the driven nozzles being 31.

In this embodiment, a nozzle pitch is set to a 2-dot pitch (k=2) (=$2/360$ inches). A secondary scanning distance is set to a 3-dot pitch (m=k+j=k+1=3) (=$3/360$ inches) for the first and last secondary scanning. For the secondary scanning other than the foregoing first and last secondary scanning, a secondary scanning distance is set to a 31-dot pitch (n=31) (=$31/360$ inches), which is for the interlaced printing.

As seen from FIG. 5, a width of the incomplete print region caused at each of the start of the printing and the termination of the printing is $2/360$ inches. On the other hand, although not shown in the drawings, if only the interlaced printing is performed under the same condition, a width of the incomplete print region is known to be $^{30}/_{360}$ inches. Accordingly, the widths of the incomplete print regions are largely reduced and thus offset distances of the print head are largely diminished also in this embodiment.

As appreciated, this embodiment further achieves advantageous effects as those achieved in the foregoing first preferred embodiment.

Now, a fourth preferred embodiment of the present invention will be described hereinbelow.

Figure 6:
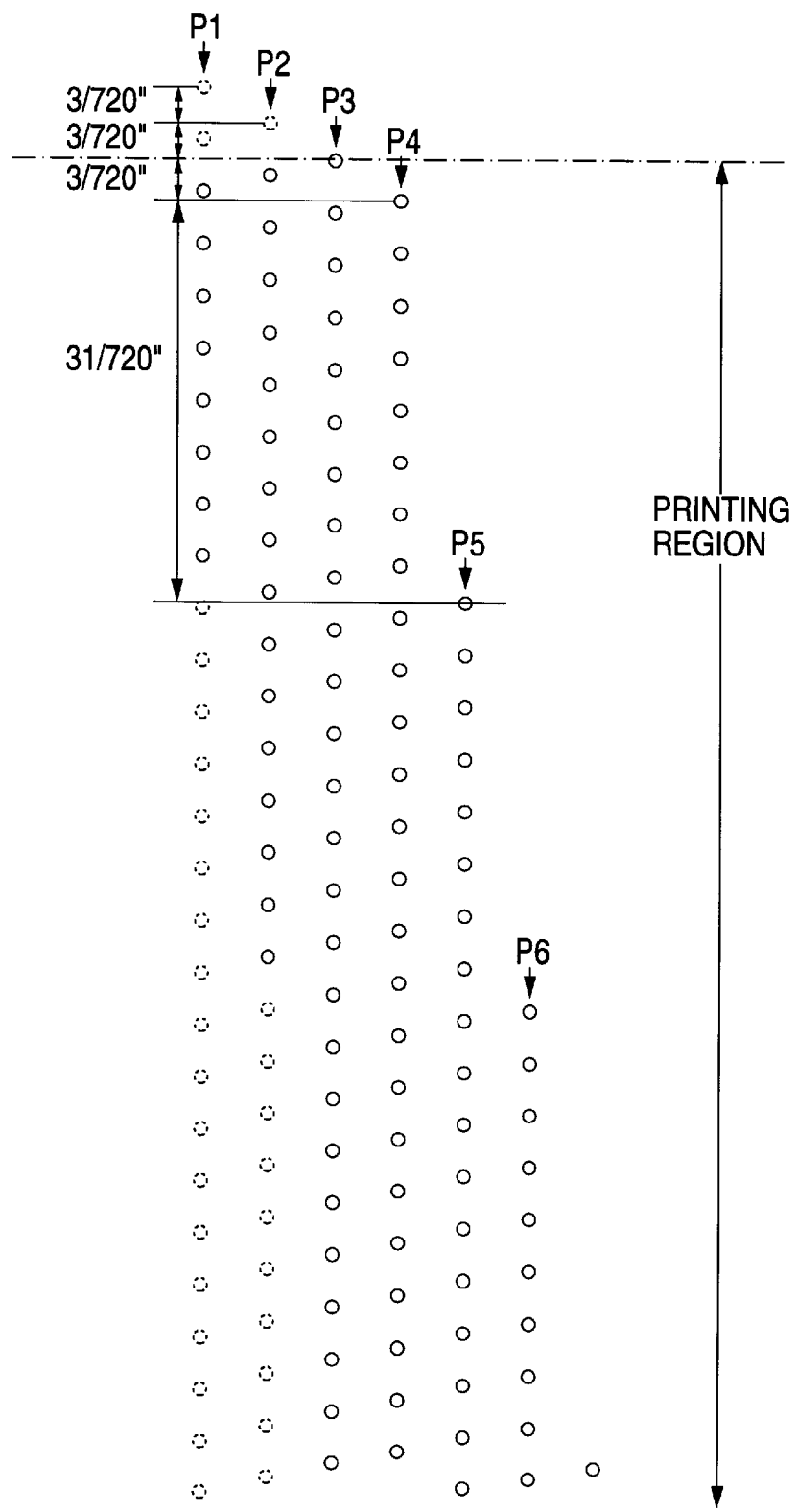
FIG. 6 is an explanatory diagram showing nozzle positions just after the start of printing according to a fourth preferred embodiment of the present invention.

FIG. 6 shows positions of the nozzle array just after the start of the printing. The positions of the nozzle array just before the termination of the printing are not shown in the drawings. As obvious from the relationship between FIGS. 1 and 2, the figure therefor may be achieved by rotating FIG. 6 by 180 degrees.

The fourth preferred embodiment is employed for printing an image with a resolution of 720 dpi using the same nozzle array as in the foregoing third preferred embodiment.

In this embodiment, the number n of the nozzles to be driven or used is set to 31. A nozzle pitch is set to a 4-dot pitch (k=4) (=$^{4}/_{720}$ inches). A secondary scanning distance is set to a 3-dot pitch (m=k−j=k−1=3) (=$^{3}/_{720}$ inches) for the two-times when the secondary scanning is performed at each of the start of the printing and the termination of the printing. At all other times, the secondary scanning distance is set to a 31-dot pitch (n=31) (=$^{31}/_{720}$ inches), which is for the interlaced printing.

As seen from FIG. 6, a width of the incomplete print region caused at each of the start of the printing and the termination of the printing is $^{6}/_{720}$ inches. On the other hand, although not shown in the drawings, if only the interlaced printing is performed under the same condition, a width of the incomplete print region is known to be $^{90}/_{720}$ inches. Accordingly, the widths of the incomplete print regions are largely reduced and thus offset distances of the print head are largely diminished also in this embodiment.

As appreciated, this embodiment further achieves advantageous effects as those achieved in the foregoing first preferred embodiment.

Figure 7:
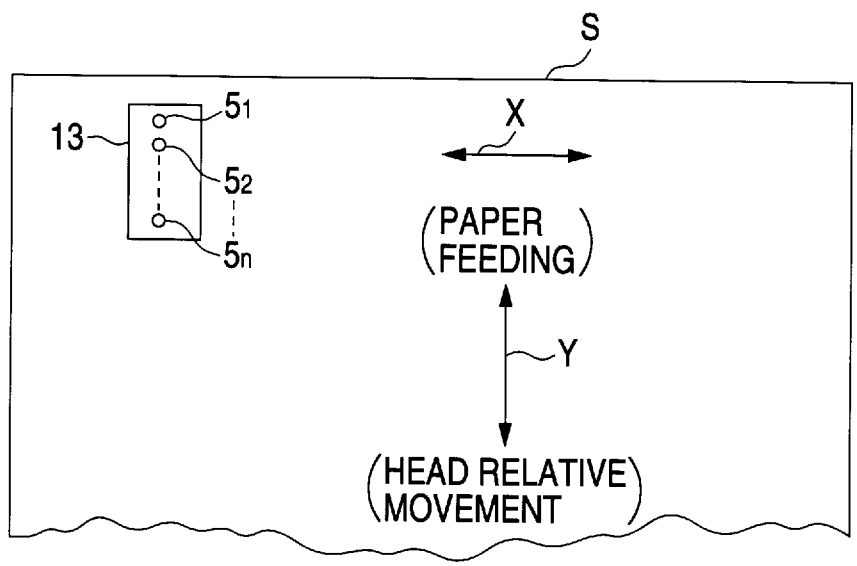
FIG. 7 is an explanatory diagram showing a positional relationship between a print head and a paper sheet in an ink jet printer where the present invention is applied.

FIG. 7 shows a positional relationship between a print head and a paper sheet in an example of an ink jet printer where the present invention is applied.

In FIG. 7, the print head 13 includes N dot forming elements (ink jet nozzles) 51~5n arranged in a secondary scanning direction Y. The dot forming elements 51~5n are arranged at a k-dot pitch. The print head 13, while moving in a main scanning direction X relative to the paper sheet S, prints dot patterns on a rectangular region of the paper sheet S covered by the dot forming elements 51~5n. When one main scanning pass is achieved, the paper sheet S is fed in the secondary scanning direction by a unit of an m-dot pitch, and then the subsequent main scanning pass is performed. After the operations are repeated a given number of times, the normal interlaced printing is performed moving the print head in the secondary scanning direction by a unit of an n-dot pitch. Then, finally, the foregoing operations moving the print head in the secondary scanning direction by the unit of the m-dot pitch are again repeated a given number of times. In this fashion, the regions of the paper sheet S to be printed are all covered.

Although not shown in the drawings, this printer is connected to an external host computer. In response to data and commands inputted from the host computer, the printer controls operations of the dot forming elements 51~5n during each main scanning pass of the print head, the number of the dots for the paper feeding in the secondary scanning direction and others. Since the mutual operations between the host computer and the printer are known in the art, no particular explanation thereof is provided herein.

In the foregoing preferred embodiments, the integer j is set to 1, that is, m=k±1. On the other hand, the integer j may take another value other than 1 as long as m=k±j is less than n and has no prime factors greater than one in common with n.

Further, as appreciated, if m is set to k−j or k+j, once the secondary scanning is performed with the secondary scanning distance of m-dot pitch, each nozzle is moved to a position adjacent to the one-ahead nozzle at an upper or lower side thereof. This means that, as the number of times of the main scanning increases, the adjacent lines are printed in a given order. Specifically, when m=k−j, a line adjacent to the last-printed line is next printed at the upper side of the last-printed line, while, when m=k+j, a line adjacent to the last-printed line is next printed at the lower side of the last-printed line. Accordingly, by selecting one of m=k−j and m=k+j as in the foregoing preferred embodiments, the lines are printed in the order which is consistent with the printing order of the lines achieved through the secondary scanning using the secondary scanning distance of n-dot pitch.

While the present invention has been described in terms of the preferred embodiments, the invention is not limited thereto, but can be embodied in various ways without departing from the principle of the invention as defined in the appended claims.

What is claimed is:

1. A serial printer comprising:

a print head having N dot forming elements arranged in a secondary scanning direction at an element pitch that is k times a dot pitch in print resolution, wherein N and k are integers;

feeding means for performing secondary scanning of a print medium relative to said print head in the secondary scanning direction;

main scanning control means for controlling said dot forming elements to print on the print medium while controlling said print head to perform main scanning across the print medium; and secondary scanning control means for controlling said feeding means to perform the secondary scanning on the print medium after said main scanning, wherein the secondary scanning, at least one time at each of a start of the printing and a termination of the printing, utilizes a first secondary scanning distance which is m times said dot pitch, wherein the secondary scanning, at times other than at the start and the termination, utilizes a second secondary scanning distance which is n times said dot pitch, and wherein m is an integer which is greater than one but less than n and has no prime factors greater than one in common with k, n is an integer no greater than N and represents a number of said dot forming elements being controlled to print, and k is no greater than n and has no prime factors greater than one in common with n.

2. The serial printer according to claim 1, wherein, given that j is an integer no less than one and less than n, m has no prime factors greater than one in common with k and is selected to be one of k−j and k+j.

3. The serial printer according to claim 2, wherein said one of k−j and k+j is selected so as to print lines in an order which is consistent with a printing order of lines achieved through the secondary scanning using said second scanning distance.

4. The serial printer according to claim 3,
wherein said main scanning control means drives all of said dot forming elements to print, during the main scanning at the times other than the start and the termination, utilizing said second secondary scanning distance, and
wherein said main scanning control means suppresses at least a portion of said dot forming elements from printing during the main scanning at the at least one time at each of the start and the termination of the printing.

5. The serial printer according to claim 2,
wherein said main scanning control means drives all of said dot forming elements to print, during the main scanning at the times other than the start and the termination, utilizing said second secondary scanning distance, and
wherein said main scanning control means suppresses at least a portion of said dot forming elements from printing during the main scanning at the at least one time at each of the start and the termination of the printing.

6. The serial printer according to claim 1,
wherein said main scanning control means drives all of said dot forming elements to print, during the main scanning at the times other than the start and the termination, utilizing said second secondary scanning distance, and
wherein said main scanning control means suppresses at least a portion of said dot forming elements from printing during the main scanning at the at least one time at each of the start and the termination of the printing.

7. A printing method comprising the steps of:
(A) arranging N dot forming elements in a secondary scanning direction, N being an integer, a pitch of the dot forming elements being k times a dot pitch in print resolution;
(B) performing a main scanning for moving the dot forming elements in a main scanning direction;
(C) driving the dot forming elements for forming a number of dots at the step (B);
(D) performing a first secondary scanning for moving the dot forming elements in a secondary scanning direction at least once at each of the start of the printing and the termination of the printing, and using a first secondary scanning distance which is m times the dot pitch, m being an integer which is greater than one but less than n and has no prime factors greater than one in common with k, wherein n is an integer no greater than N and represents the number of the dot forming elements to be driven, and k is an integer which is no greater than n and has no prime factors greater than one in common with n; (E) performing a second secondary scanning for moving the dot forming elements in the secondary scanning direction and using a second secondary scanning distance which is n times the dot pitch; and
(F) repeating the steps (B), (C) and (E).

8. The printing method according to claim 7, wherein, given that j is an integer no less than one and less than n, m has no prime factors greater than one in common with k and is selected to be one of k−j and k+j.

9. The printing method according to claim 8, wherein the one of k−j and k+j is selected so as to print lines in an order which is consistent with a printing order of lines achieved through the steps (B), (C) and (E).

10. The printing method according to claim 9,
wherein all the dot forming elements are driven to print during the step (B) at times other than during the start and the termination of the printing, and
wherein only a portion of the dot forming elements are driven to print during the step (B) during the start and the termination of the printing.

11. The printing method according to claim 8,
wherein all the dot forming elements are driven to print during the step (B) at times other than during the start and the termination of the printing, and
wherein only a portion of the dot forming elements are driven to print during the step (B) during the start and the termination of the printing.

12. The printing method according to claim 7,
wherein all the dot forming elements are driven to print during the step (B) at times other than during the start and the termination of the printing, and
wherein only a portion of the dot forming elements are driven to print during the step (B) during the start and the termination of the printing.

13. A method for printing a sheet having leading and trailing portions and a body portion extending between the leading and the trailing portions, said method utilizing a print head having N dot forming elements arranged in a secondary scanning direction that is essentially orthogonal to a main scanning direction and at an element pitch that is a multiple k of a print resolution dot pitch, comprising:
performing a first main scanning pass with the print head in the main scanning direction in the leading portion of the sheet while enabling at least a portion of the N dot forming elements to print;
advancing the sheet relative to the print head in the secondary scanning direction by a first scanning distance that is a multiple m of the print resolution dot pitch;
performing a second main scanning pass with the print head in the main scanning direction in the body portion of the sheet while enabling all of the N dot forming elements to print;
advancing the sheet relative to the print head in the secondary scanning direction by a second scanning distance, greater than the first scanning distance, that is a multiple n of the print resolution dot pitch; and
performing a third main scanning pass with the print head in the main scanning direction in the body portion of the sheet while enabling all of the N dot forming elements to print;
wherein k, m and n are integers, k and m are mutually prime, k and n are mutually prime, and m is an integer greater than one and less than n.

14. The method according to claim 13, further comprising:
advancing the sheet relative to the print head in the secondary scanning direction by the first scanning distance that is a multiple m of the print resolution dot pitch; and
performing a fourth main scanning pass with the print head in the main scanning direction in the trailing portion of the sheet while enabling at least a further portion of the N dot forming elements to print.

15. The method according to claim 13, wherein only a subset of the dot forming elements is enabled to print during the first main scanning pass.

* * * * *